(12) United States Patent
Ghaboosi et al.

(10) Patent No.: US 9,788,216 B2
(45) Date of Patent: Oct. 10, 2017

(54) METHOD AND APPARATUS FOR HETEROGENEOUS SMALL CELLS SELF-ORGANIZATION IN LTE NETWORKS BASED ON INTERNET PROTOCOL MULTIMEDIA SUBSYSTEMS

(71) Applicant: Avago Technologies General IP (Singapore) Pte. Ltd.

(72) Inventors: Kaveh Ghaboosi, Mountain View, CA (US); Manish Vemulapalli, San Diego, CA (US); Jim Oates, La Jolla, CA (US); Yuqiang Tang, Plano, TX (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 643 days.

(21) Appl. No.: 14/039,967

(22) Filed: Sep. 27, 2013

(65) Prior Publication Data

US 2015/0093996 A1    Apr. 2, 2015

(51) Int. Cl.
*H04W 24/02* (2009.01)
*H04W 84/04* (2009.01)
*H04W 52/14* (2009.01)
*H04W 52/24* (2009.01)
*H04W 52/40* (2009.01)

(52) U.S. Cl.
CPC ......... *H04W 24/02* (2013.01); *H04W 52/143* (2013.01); *H04W 52/244* (2013.01); *H04W 52/40* (2013.01); *H04W 84/045* (2013.01)

(58) Field of Classification Search
CPC ..... H04W 4/00; H04W 24/02; H04W 84/045; H04W 52/244; H04W 36/14; H04W 36/055; H04W 68/02; H04W 36/20; H04W 36/22; H04W 52/40; H04W 52/143; H04L 67/12
See application file for complete search history.

(56) References Cited

U.S. PATENT DOCUMENTS

| | | | | |
|---|---|---|---|---|
| 2010/0272268 A1* | 10/2010 | Sambhwani | ...... | H04W 36/0055 380/287 |
| 2011/0249658 A1* | 10/2011 | Wohlert | .................. | H04W 4/04 370/338 |
| 2014/0113653 A1* | 4/2014 | Wendling | .............. | H04W 68/02 455/456.1 |
| 2014/0162659 A1* | 6/2014 | Aminaka | .............. | H04W 36/14 455/437 |
| 2014/0162662 A1* | 6/2014 | Nagata | .................. | H04W 36/20 455/444 |

(Continued)

*Primary Examiner* — Thanh Le
(74) *Attorney, Agent, or Firm* — Sterne, Kessler, Goldstein & Fox P.L.L.C.

(57) ABSTRACT

A wireless network includes a plurality of small cells. The small cells each register with the network, and an application server tracks the locations of the small cells within the network. Upon entry to the network, the small cell registers with various event packages managed by the application server. When a small cell in the network updates its configurations and/or parameters, the small cell publishes those changes to the application server. The application server determines other nearby small cells that are "interested" in those changes based on their proximity to the changed cell. The application server then notifies those proximate cells of the changes made to the changed cell so that the proximate cells can update their own configurations.

21 Claims, 7 Drawing Sheets

(56) References Cited

U.S. PATENT DOCUMENTS

2014/0242991 A1* 8/2014 Yanover ............... H04W 36/22
                                                                       455/436
2014/0316736 A1* 10/2014 Strohbach ............... H04L 67/12
                                                                       702/127

* cited by examiner

METHOD AND APPARATUS FOR HETEROGENEOUS SMALL CELLS SELF-ORGANIZATION IN LTE NETWORKS BASED ON INTERNET PROTOCOL MULTIMEDIA SUBSYSTEMS

BACKGROUND

Field

The disclosure relates to intercommunication among wireless small cells, and more specifically to self-calibration and self-organization between small cells in an LTE environment.

Related Art

Conventionally, Small Cells include limited or no self-organization capabilities. Further, such capabilities are often limited to Small Cells within privately held enterprise networks, where the Small Cells are connected to a Local Area Network (LAN), which is often wired. Through the LAN, the local Small Cells establish an X2 interface to exchange information.

These functionalities are generally not provided to heterogeneous Small Cell networks because doing so would have several negative impacts on the base station (HeNB) hardware. For example, in order to successfully perform the conventional self-organizational techniques, HeNBs would need to be outfitted with additional capabilities, such as for example a radio sniffing component. This component enables the HeNBs to support Network Listen Mode functionality, which is specified and recommended by 3GPP to facilitate network information collection by the Small Cells' HeNB. However, adding this functionality introduces additional cost to the HeNB hardware, and also results in higher power consumption by the device. Further, radio sniffing can be a highly inaccurate process, meaning that the reliability of information acquired is insufficient for performing accurate self-organization calculations and other processing.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various wireless communication environments without departing from the spirit and scope of the present disclosure.

An Exemplary Wireless Communication Environment

Figure 1:
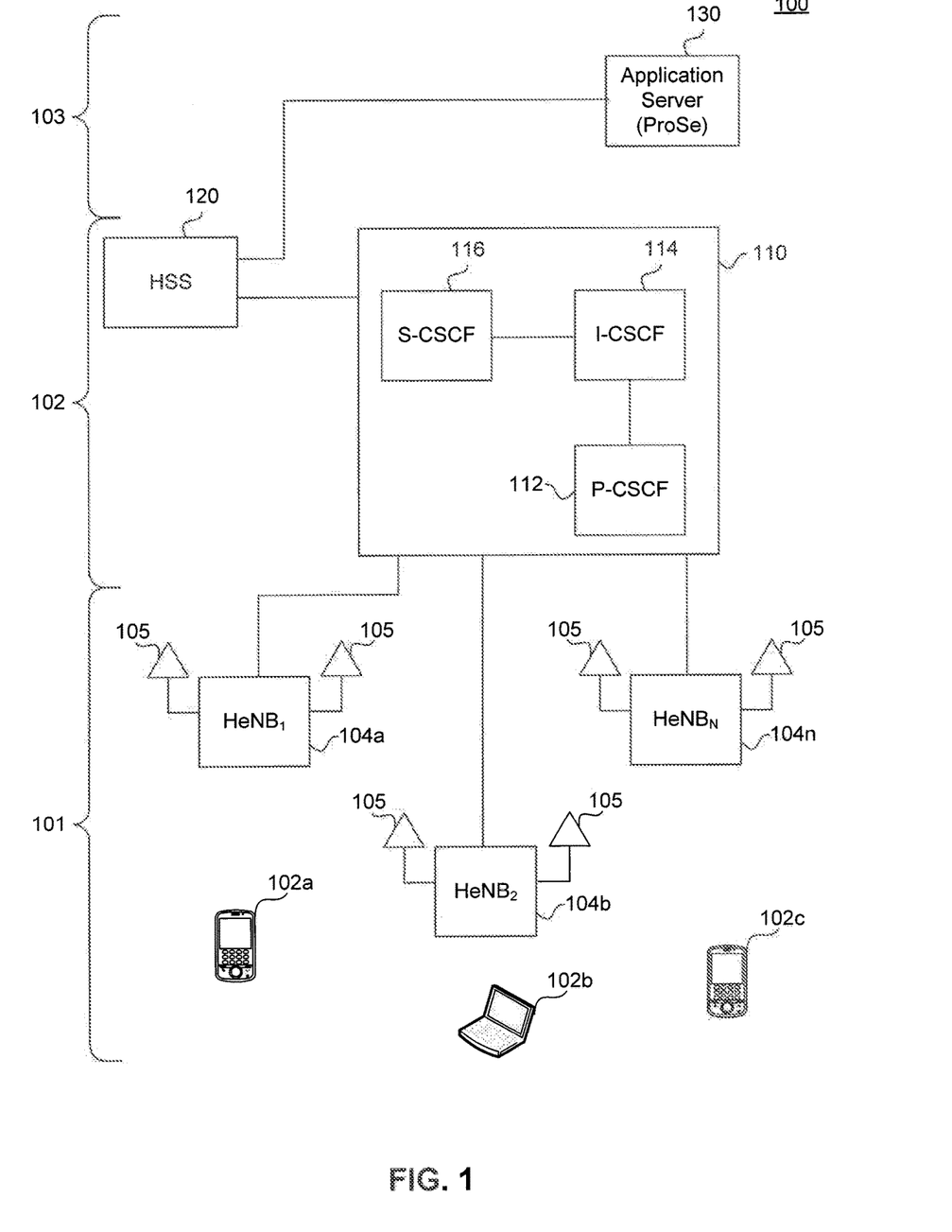
FIG. 1 illustrates a block diagram of an exemplary wireless communication environment.

FIG. 1 illustrates a block diagram of an exemplary wireless communication environment 100. The wireless communication environment 100 provides communication connectivity to several items of user equipment (UE) 102a-102n. The configuration of the wireless communication environment 100 can be abstractly viewed in different layers. For example, in an embodiment, a transport layer 101 includes the UEs 102, as well as base stations 104, and is where device communication and connectivity occurs at the lowest level. An IP Multimedia Subsystem (IMS) layer 102 includes a Call Session Control Function (CSCF) module 110 and a Home Subscriber Server (HSS) 120, and is where packet signaling, routing, authentication, and other mid-level functions take place. An application level 103 includes an application server 130, and is where many services are hosted and executed. These various layers work in tandem to provide connectivity to UEs.

The user equipment 102 can constitute cellular telephones 102a and 102c, laptop computers 102b, as well as any number of additional devices that are capable of communicating using 2G, 3G, 4G, or other applicable communications standard. The UEs 102 each connect with a base station 104, referred to ire the wireless communications domain as a Home Evolved Node B (HeNB), or also referred to herein as a "small cell." The environment can include any number of HeNBs 104 for providing network connectivity to UEs 102 within the environment 100. Each HeNB 104 includes one or more antennas 105 for transmitting and receiving information with one or more of the UEs 102. Further each of the HeNBs 104 are connected to the CSCF module 110 in the IMS layer 102.

The CSCF module 110 includes several functional sub-modules which are used to process Session Initiation Protocol (SIP) signaling packets in the IMS. In particular, the CSCF module 110 includes a Proxy-CSCF module (P-CSCF) 112 that operates as the first point of contact for the IMS terminal so as to provide a user-network interface to the transport layer 101. The CSCF module 110 also includes an Interrogating-CSCF (I-CSCF) module 114 that is configured to forward SIP requests and/or responses to a Serving-CSCF (S-CSCF) module 116. The S-CSCF module 116 is the central node of the signaling plane and performs both SIP server and session control functions. More details regarding the specific functionality of the various CSCF modules as they relate to the present disclosure will be discussed below as they become relevant. The CSCF module 110 is connected to the Home Subscriber Server (HSS) 120, which is a master user database that supports the IMS network entities that actually handle calls. The HSS 120 contains the subscription-related information (e.g., subscriber profiles), and can provide information about the subscribers.

The application server 130 in the application layer 103 hosts and executes various services, as well as assists in the self-organization of the HeNBs 104 described in detail below.

Together, the many components of the wireless communication environment 100 function to provide connectivity and service to the UEs 102. Utilizing these devices in unique ways, the HeNBs 104 can perform self-organization through inter-communication and information sharing, as is described below.

An Exemplary Home Evolved Node B

Figure 2:
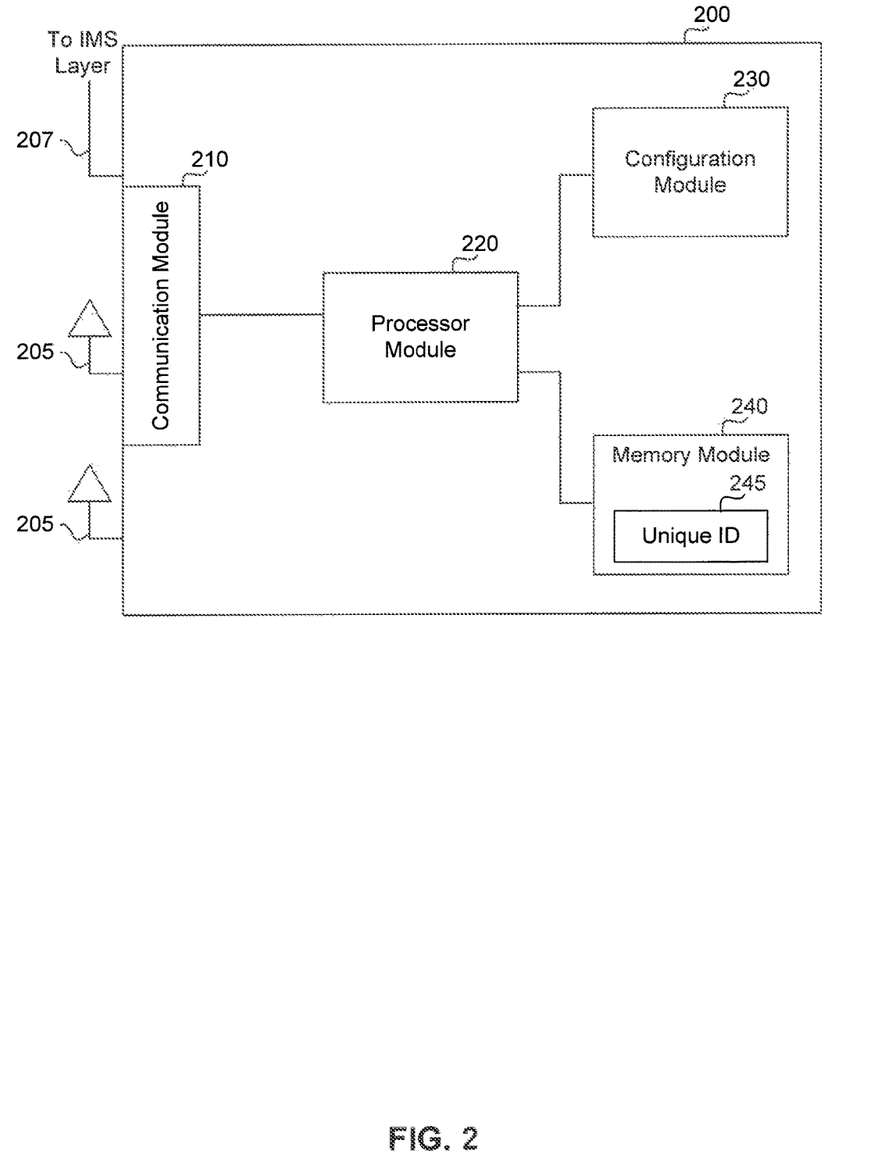
FIG. 2 illustrates a block diagram of an exemplary HeNB.

FIG. 2 illustrates a block diagram of an exemplary HeNB 200. The HeNB 200 includes a communication module 210 for providing communication between the HeNB 200 and various external devices. For example, one or more antennas 205 may be connected to the communication module 210 for providing wireless communication to the UEs 102 in the wireless communication environment 100. Also, a wired connection 207 may provide communication to the CSCF module 110 in the IMS layer 102 of the wireless communication environment 100.

A processor module 220 is connected to the communication module 210 and is configured to process incoming and outgoing signals. A configuration module 230 and a memory module 240 are connected to the processor module 220. The configuration module 230 is configured to store aspects relating to device configurations of the HeNB 200, which can be altered by the processor module 220 during self-organization. In an embodiment, the actual configuration parameters can be stored off-device and accessed by the communication module 210. The memory module 240 is configured to perform general data storage for the HeNB 200, but stores a globally-unique identification of the HeNB 200 in a Unique ID register 245.

Self-Organization

Self-organization can be performed within the wireless communication environment 100 so as to allow HeNBs 104 to configure their own characteristics for optimization or to adjust to changes made to nearby HeNBs 104. There are several aspects of self-organization, such as registration, publication, and subscription, among others, which will be described in detail below. Together, these aspects allow the HeNBs within the wireless communication environment 100 to self-configure and cooperate with each other so as to maintain preferred communication configurations.

Registration

Figure 3:
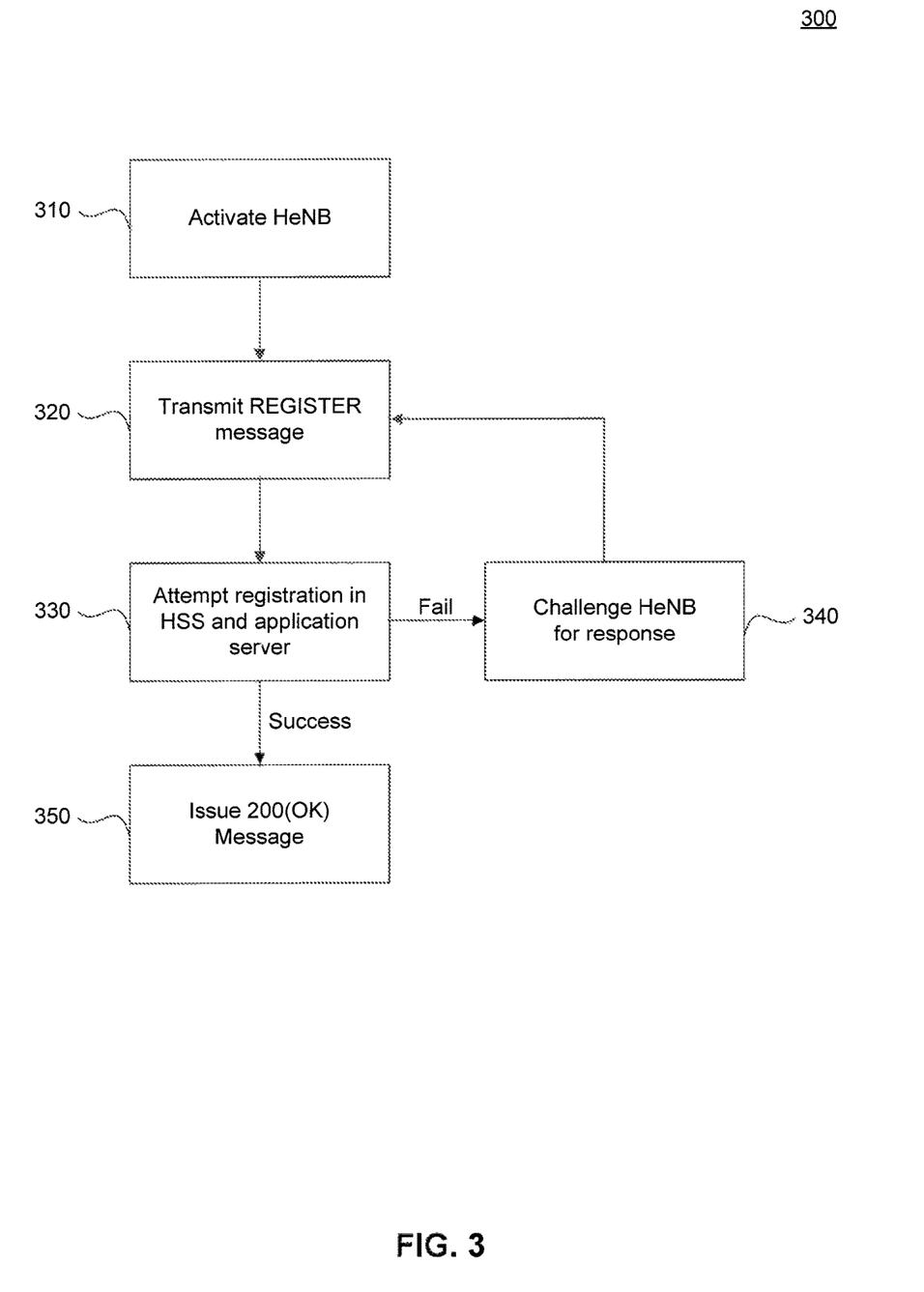
FIG. 3 illustrates an exemplary profile stored on an application server.

As an initial matter, each small cell (e.g., HeNB 104a) must register with the network upon activation and prior to providing service to UEs 102 in the wireless communication environment 100. One important aspect of this registration is the associating (i.e., "binding") of the HeNB's Unique ID to its IP address and its instantaneous location. FIG. 3 illustrates a flowchart diagram of an exemplary method 300 for registering a HeNB 104a with the network.

In order to perform the registration, upon activation (step 310), the HeNB 104a issues a SIP REGISTER request (step 320), with the Request-URI set to its home realm, to the P-CSCF module 112. An exemplary home realm, for purposes of this discussion, could be sip:smallcell.broadcom.com. The P-CSCF module 112 routes the request to the I-CSCF module 114, which in turn contacts the HSS 120 to authorize the HeNB 104a (step 330).

Upon successful authorization, the I-CSCF module 114 routes the request to the S-CSCF module 116, which uses a Diameter protocol to contact the HSS 120 to request that it provide instructions to authenticate the HeNB 104a. If the HSS 120 issues a "not authorized" message (step 330—fail), the S-CSCF module 116 challenges the HeNB 104a (step 340) by returning a 401 (Unauthorized) final response. Subsequently, the HeNB 104a issues yet another REGISTER request with the response to the challenges from the HSS 120 (step 320). Once successfully authorized and authenticated, the S-CSCF module 116 forwards the SIP REGISTER request to the application server 130. In an embodiment, the application server 130 interacts with the HSS 120 to perform further authorization, verification, and/or profile extraction for the received registration and activation request. After the HeNB 104a has been successfully authorized by the network (step 330—success) and its registration is complete, the application server 130 transmits a 200 (OK) final response (step 350), which notifies the HeNB 104a of its successful registration.

Below is an exemplary REGISTER request signal transmitted by the HeNB 104a to the CSCF module 110 according to an embodiment:

```
REGISTER sip:smallcell.broadcom.com SIP/2.0
Via: SIP/2.0/UDP 11.10.71.6:19392;branch=z9hG4bK652hsge
Route: <sip:p-cscf.vplmn1.com;lr>
Contact:<sip:confroom.modem.systest@11.10.71.6:19392;tran
sport=udp>
To:<sip:confroom.modem.systest@smallcell.broadcom.com>
From:<sip:confroom.modem.systest@smallcell.broadcom.com>;
tag=4hy174z
Call-ID: b89rjhnedlrfjf1slj40a222@smallcell1.vplmn1.com
CSeq: 1 REGISTER
Max-Forwards: 70
Expires: 3600
Allow: CANCEL, OPTIONS, INFO, SUBSCRIBE, NOTIFY, PUBLISH, MESSAGE
Accept: application/smallcell-info+xml
Content-Length: 0
```

Below is an exemplary 200 (OK) message signal transmitted by the application server 130 upon successful registration of the HeNB 104a according to an embodiment:

```
SIP/2.0 200 OK
Via: SIP/2.0/UDP 11.10.71.6:19392;branch=z9hG4bKnashd92
Contact:<sip:proseappsrv.smallcell.broadcom.com;gr>;isPro
SeAS
To:<sip:confroom.modem.systest@smallcell.broadcom.com>;ta
g= ja743klflH
From:<sip:confroom.modem.systest@smallcell.broadcom.com>;
tag=37GkEhwl6
Call-ID: b89rjhnedlrfjflslj40a222@smallcell1.vplmnl.com
CSeq: 2 REGISTER
Max-Forwards: 67
Expires: 3600
Accept: application/smallcell-info+xml
Content-Length: 0
```

Profiles

As discussed above, as part of the registration process, the HeNB 104a is bound to its Unique ID and its IP address. In an embodiment, each HeNB 104 (also referred to herein as a "small cell") is identified by an IMS Public Cell Identity (IMPCI) hereinafter referred to as the Unique ID of the HeNB 104. This Unique ID can be stored in the memory module 240 of the HeNB 200, and can be set during manufacturing or prior to or after placement into the wireless communication environment 100. In an embodiment, the format of the Unique ID can follow the same rules applicable to SIP Uniform Resource Identifiers (URIs). An exemplary Unique ID for a particular HeNB 104 (e.g. HeNB 104a, as shown in the above REGISTER message) can be sip:confroom.modem.systest@smallcell.broadcom.com.

Using this Unique ID, a profile for identifying the HeNB 104a and its capabilities/properties can be individually established and stored at the HSS 120 and the application server 130 during the registration process. The profile stored at the HSS 120 can be different from the profile stored at the application server 130 according to the information relevant to those devices.

On the application server 130, the HeNB profile includes the HeNB's globally-unique identifier as the master interior node, used to allow a reference to lower interior children nodes, as well as a list of the HeNB's attributes. Such attributes may include (without being limited to) status (e.g., active, inactive, etc.), type (e.g., open access, closed access, a.k.a., closed subscriber group (CSG), hybrid, etc.), location (e.g., street address, geographic coordinates, etc.), IP address, functional information (e.g., physical cell identity, Evolved Cell Global Identity, a.k.a., eCGI), and non-functional information (e.g., HeNB name), among others.

Figure 4:
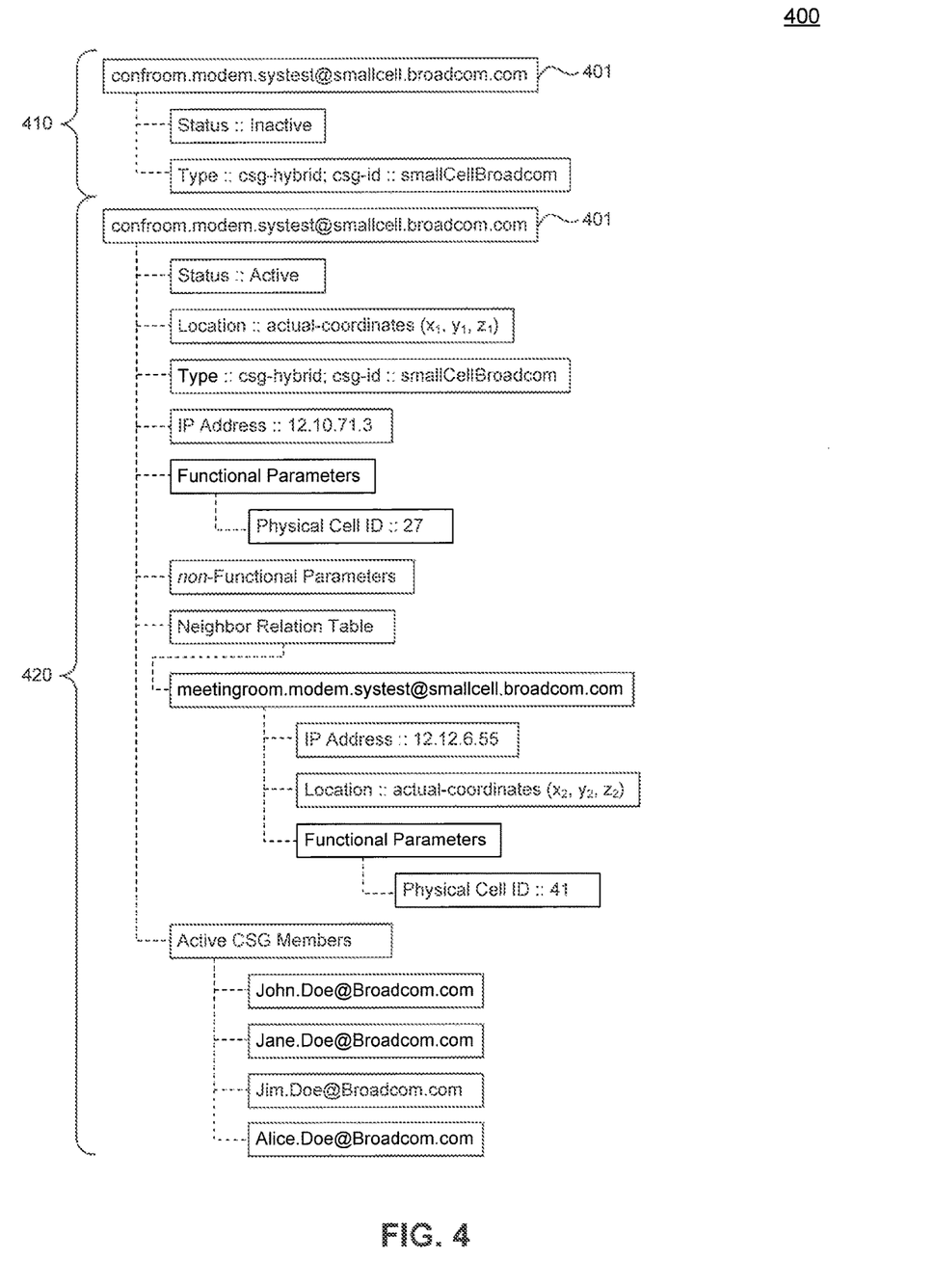
FIG. 4 illustrates an exemplary HeNB profile stored on the application server.

FIG. 4 illustrates an exemplary HeNB profile 400 stored on the application server 130. As shown in FIG. 4, the profile 400 includes an inactive profile 410 and an active profile 420 that are each identified by the HeNB's unique ID 401. The inactive profile 410 is used by the application server 130 when the HeNB is in an inactive state, whereas the active profile 420 is used when the HeNB is in an active state. In an embodiment, the inactive profile 410 includes much less information that the active profile 420. For example, the exemplary inactive profile 410 includes only the HeNB status and type under its Unique ID whereas the active profile 420 includes much more information.

The interior child node Neighbor Relation Table (NRT) included within the active profile 420 provides references to lower interior children nodes, each of which represents a discovered and identified neighbor small cell, and their respective attributes. Therefore, the "meetingroom.modem.systest@smallcell.broadcom.com" label identifies a neighboring small cell and some of its relevant attributes, including its IP address, location and functional parameters. In addition to the NRT, there is another interior node identified as "Active CSG Members." This interior node provides a list of IMS subscribers that are currently being served by the HeNB 104a, provided that the HeNB 104a is registered with the Closed Subscriber Group (CSG), as discussed above.

As discussed above, the HSS 120 also includes a profile of the HeNB 104a. However, the profile on the HSS 120 is different from the profile on the application server. For example, in an embodiment, the profile on the HSS 120 is labeled by a human-readable profile descriptor, which may have any arbitrary format, such as actual location/address where the HeNB 104a is being deployed, or a combination of the name and address of the organization that owns or is using the small cell. This profile descriptor functions as the master interior node, which is used to allow a reference to the HeNB's Unique ID and its Service Profile. The Service Profile catalogs the services that are available at the HeNB 104a.

Figure 5:
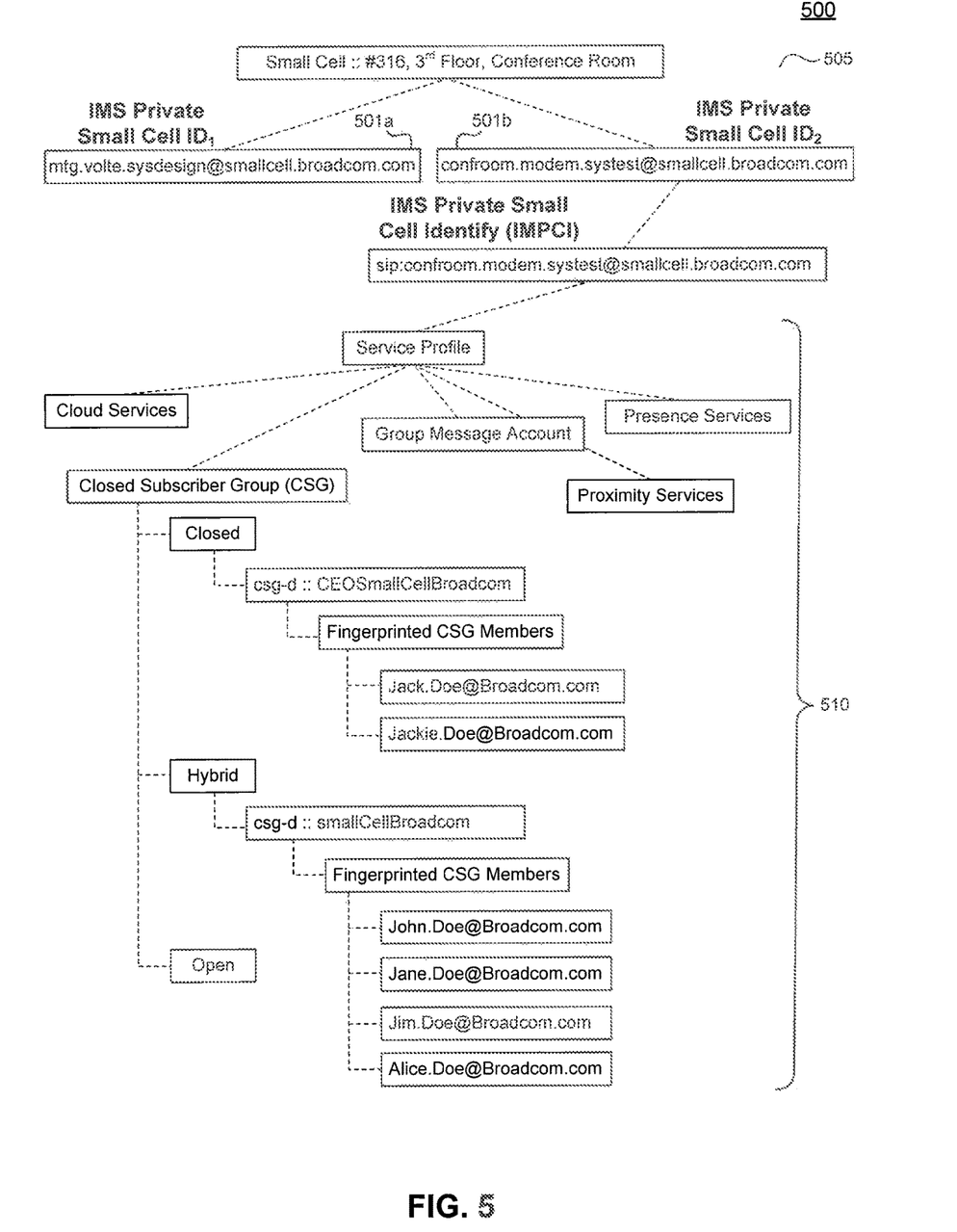
FIG. 5 illustrates an exemplary HeNB profile stored on a Home Subscriber Server.

FIG. 5 illustrates an exemplary HeNB profile 500 stored on the HSS 120. As shown in FIG. 5, the profile 500 includes the human-readable descriptor as its master interior node. In the example shown in FIG. 5, the descriptor is a description of the location of the small cell, i.e., "Small Cell:: #316, 3$^{rd}$ Floor, Conference Room." Nodes underneath this master interior node identify the small cells present at the location. In the example profile of FIG. 5, there are two small cells at the location, including a first small cell 501a and a second small cell 501b, which are both identified by their private IDs.

Listed underneath the private ID of the second small cell 501b is the public identity of the second small cell and its Service Profile 510. The Service Profile 510 lists the services available at the second small cell 501b, including cloud services, closed subscriber services, group message account, proximity services, and presence services. It should be understood that fewer or more services may be included in the Service Profile 510. Details are provided for relevant services. For example, the Closed Subscriber Group (CSG)

service lists the different types of CSG services (e.g., closed, hybrid, and open), and lists the identifications of groups and their corresponding members authorized to use those services. These identifications represent those that can be served by the small cell in these modes.

Through the use of these profiles, the identities and information regarding the various HeNBs 104 in the network 100 can quickly be referenced by components of the IMS layer 102 and application server 130, and/or for providing to other HeNBs 104 in the network 100 for self-configuration and self-organization.

Subscribing

After being registered with the network, the small cell will be capable of performing self-organization provided that it is able to receive information of other small cells that may have an impact on its performance capabilities, needs, etc. Therefore, in an embodiment, the HeNB 104 should "subscribe" to receive certain notifications from the network regarding changes to nearby small cells and other information that will be relevant to performing self-organization.

In order to receive information that may be relevant to self-organization, the small cell requests for current functional and non-functional parameters and any configuration information update notifications of its neighboring small cells. In order to make this request, the HeNB 104 issues a SIP SUBSCRIBE request to the CSCF module 110 in the IMS layer 102.

In an embodiment, the SIP SUBSCRIBE request includes an "Expires" header field which identifies the duration of its subscription. In order to keep subscriptions effective beyond this duration, the HeNB 104 must periodically refresh this subscription using a new SIP SUBSCRIBE request. In addition, the request must identify the specific event types for which it would like to receive notifications. For example, the request can include an "Event" header field, such as "Event: self-organization," which will notify the network to send information relevant for self-organization to the HeNB 104. In an embodiment, the HeNB 104 can also subscribe to the registration-state event package. The registration-state event package is an abstract object that allows the HeNB 104 to receive updates on its registration with the IMS network. These updates may include registration confirmation, registration expiration, network-initiated re-registration requests, HeNB re-registration and de-registration confirmations, and registration attribute updates, among others.

In an embodiment, the SUBSCRIBE request can also identify a format for which it would like to receive informational updates. Such formant can take many forms, such as formatted text file (e.g., .txt file) or a predefined tag-format file (e.g., .xml file), among others. For example, in a configuration using .xml spreadsheet files, the SUBSCRIBE request can define a "Content-Type" and "Accept" header fields in order to cause both the HeNB and the application server 130 to accept the .xml format. In this circumstance, the SUBSCRIBE request will include the following lines of text:

```
Content-Type: application/smallcell-info+xml    (NOTIFY /
   SUBSCRIBE / PUBLISH)
Accept: application/smallcell-info+xml    (REGISTER /
   SUBSCRIBE / PUBLISH)
```

In addition, the SUBSCRIBE request should also include the instantaneous location of the HeNB 104. This location can take any format, including actual street address, global coordinates, etc. By including the location in the SUBSCRIBE request, the application server 130 can determine which other HeNBs 104 that are registered to the network are within the vicinity of the subscribing HeNB 104. This will allow the application server 130 to determine which small cells are going to impact the performance of the subscribing HeNB 104 when their parameters are changed. In other words, it will allow the application server 130 to determine which updates made to other small cells need to be forwarded to the subscribing HeNB 104 for self-organization.

The request is received by the P-CSCF module 112 and routed to the S-CSCF module 116. The S-CSCF module 116 routes the request to the application server 130. Upon receipt of the SUBSCRIBE request, the application server 130 interacts with the HSS 120 in order to perform authentication and authorization for the received request. Once authorized, the application server 130 responds to the request with a 200 (OK) message that is routed to the originating HeNB 104 via the S-CSCF module 116 and P-CSCF module 112.

Through the subscription process, the application server 130 is notified to update the subscribing HeNB 104 with self-organization update information regarding changes made to nearby small cells that may impact the performance of the subscribing HeNB 104. In a similar manner, the application server 130 can notify the neighboring small cells of changes made to the subscribing HeNB 104, provided that the application server 130 is apprised of those changes, as is discussed below.

Publishing

As discussed above, once a small cell has subscribed to the self-organization event package, it can receive updates of status changes to nearby small cells. However, in order for these changes to be provided to the subscribing small cell, the network must first learn that these changes have taken place. "Publishing" is used by the changed small cell in order to notify the application server 130 of the occurrence of these changes.

When a small cell in the network calculates (e.g., in the self-configuration phase) or re-calculates (e.g., in the self-optimization phase) some of its configuration information and/or any of its parameters, the changed small cell can notify the application server 130 of the changes by publishing the changes. For purposes of this discussion, it will be assumed that the small cell HeNB 104a is performing the publishing.

When HeNB 104a in the network changes its configurations, it issues a SIP PUBLISH request that includes its unique ID. The HeNB 104a transmits the PUBLISH message to the P-CSCF module 112, which forwards the messages to the application server 130 via the S-CSCF module 116. After the application server 130 receives the PUBLISH message, the application server 130 interacts with the HSS 120 in order to perform authentication and/or authorization. Once authenticated, the application server 130 responds to the PUBLISH message with a 200 (OK) response, which is routed back to the HeNB 104a via the S-CSCF module 116 and P-CSCF module 112.

In an embodiment, separate PUBLISH messages are generated for each updated functional attributes, including for example, location, Neighbor Relation Table, and Active-CSG-Members. As these PUBLISH messages are received by the application server 130, the application server 130 may update the profile of the HeNB 104a managed by the application server 130.

With the changes being published to the application server 130, and the small cell's profile being updated, these changes can also be forwarded to nearby small cells who have properly subscribed to the self-organization event. As a result, the small cells in the network can self-optimize and maintain high levels of optimization even during network operation and real-time changes.

Overview of Self-Organization

Figure 6:
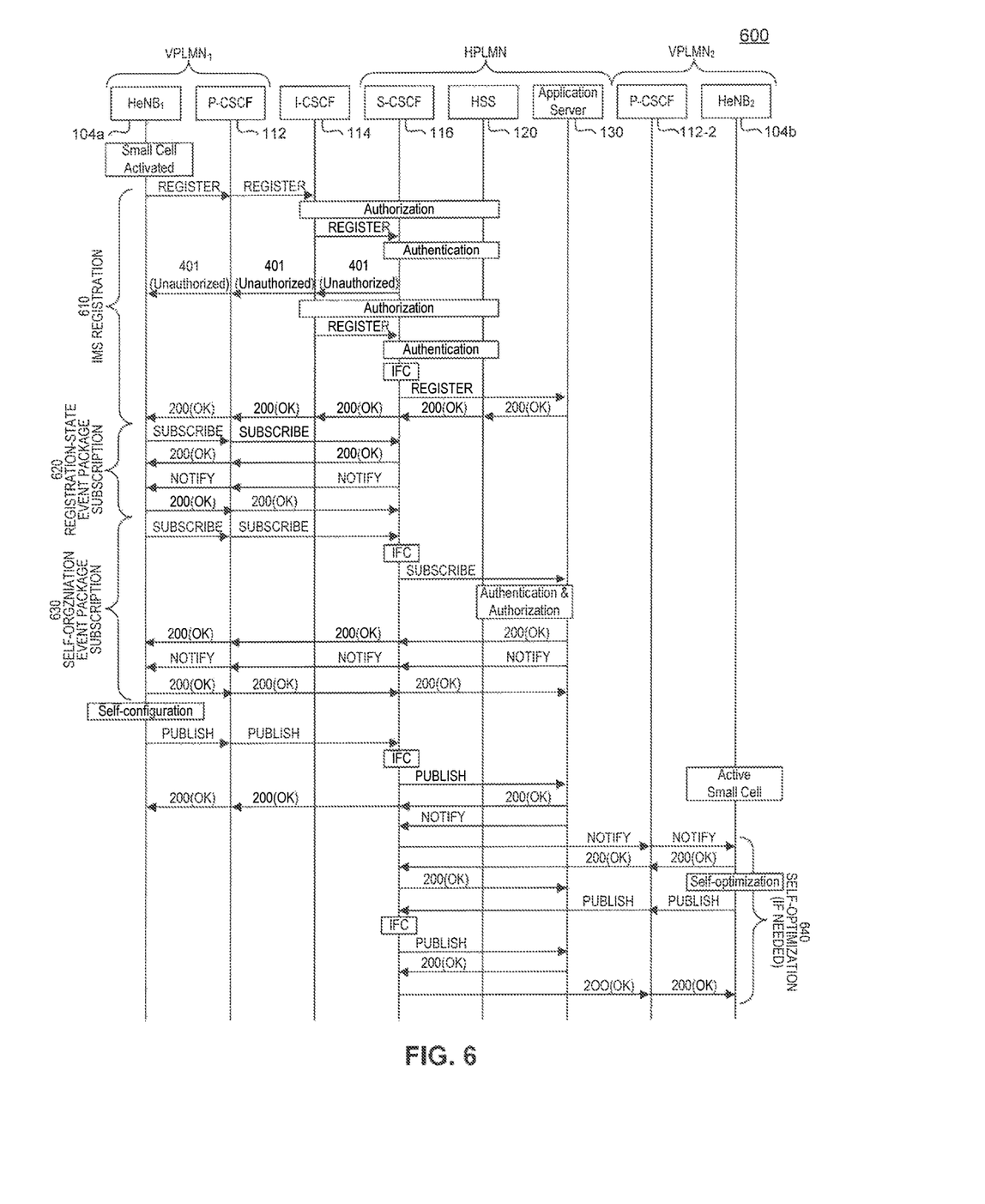
FIG. 6 illustrates a process flow diagram of an overall self-organization process.

FIG. 6 illustrates a process flow diagram of an overall self-organization process 600. The process flow 600 includes the registration 610, subscribing 620 and 630, and self-optimization 640 processes, and demonstrates the intercommunication between a first small cell $HeNB_1$ 104a in a first Visiting Public Land Mobile Network ($VPLMN_1$) and a second small cell $HeNB_2$ 104b in a second $VPLMN_2$.

Upon activating the $HeNB_1$ 104a, the $HeNB_1$ enters the registration phase 610 of the process flow 600. The registration phase 610 begins with the $HeNB_1$ 104a transmitting its REGISTER message with its Unique ID to the I-CSCF module 114 via the P-CSCF module 112. Once the REGISTER message has been received by the I-CSCF module 114, the I-CSCF module 114, the S-CSCF module 116 and the HSS 120 interact to perform authorization and authentication.

If either the authorization or authentication fails, the S-CSCF module 116 issues a 401 (Unauthorized) response message to the $HeNB_1$ 104a. In response, the $HeNB_1$ 104a issues an updated REGISTER message with any missing and/or requested information. This causes the network to again attempt to perform the authorization and authentication of the $HeNB_1$ 104a. Once successfully completed, the S-CSCF module 116 transmits a REGISTER message that includes information relating to the $HeNB_1$ 104a to the application server 130 using initial Filter Criteria (iFC), which is a set of rules for message transmission, and is known in the art. The registration of the $HeNB_1$ 104a with both the HSS 120 and the application server 130 causes each of the HSS 120 and application server 130 to generate respective profiles of the $HeNB_1$ 104a for use by the network.

Once successfully registered with the application server 130, the application server 130 transmits a 200(OK) message back to the $HeNB_1$ via the S-CSCF module 116, the C-CSCF module 114, and the P-CSCF module 112. This effectively completes the registration phase 610 of the process flow 600.

After the $HeNB_1$ 104a has successfully registered with the network, the $HeNB_1$ 104a subscribes to various notification events. This allows the $HeNB_1$ 104a to be apprised of the configurations of neighboring small cells for its own configuration. In an embodiment, the $HeNB_1$ 104a first subscribes 620 to the registration-state event package.

In order to subscribe, the $HeNB_1$ 104a transmits a SUBSCRIBE message to the P-CSCF module 112 that includes the unique ID of the $HeNB_1$ 104a. The P-CSCF module 112 forwards the message to the S-CSCF module 116, which transmits a 200(OK) message back to the $HeNB_1$ 104a to indicate receipt of the SUBSCRIBE message. Following this first 200(OK) message, the S-CSCF module 116 transmits a NOTIFY message to the $HeNB_1$ 104a requiring a 200(OK) message response from the $HeNB_1$ 104a. Once this second 200(OK) message is received by the S-CSCF module 116, the $HeNB_1$ 104a is successfully subscribed to the registration-state event.

After subscribing to the registration-state event 620, the $HeNB_1$ 104a next subscribes to the self-organization event 630. This will allow the $HeNB_1$ 104a to receive notifications of changes to nearby small cells' configurations, and facilitates self-configuration and self-optimization by the $HeNB_1$ 104a.

At the outset, the $HeNB_1$ 104a transmits a SUBSCRIBE message to the S-CSCF module 116 via the P-CSCF module 112. The S-CSCF module 116 forwards the SUBSCRIBE message to the application server 130 using initial Filter Criteria (iFC). Upon receipt of the SUBSCRIBE message, the application server 130 coordinates with the HSS 120 to perform authentication and/or authorization.

Upon successful authentication/authorization, the application server 130 responds to the $HeNB_1$ 104a with a 200(OK) message as well as a NOTIFY message. In an embodiment, the NOTIFY message includes information relating to the operational states and configurations of other small cells within the network, and may include functional and non-functional parameters of those nearby small cells.

After receiving the NOTIFY message from the application server 130, the $HeNB_1$ 104a issues a 200(OK) message (e.g., an acknowledgement message), and then performs self-configuration using the received information of the nearby small cells. During the self-configuration, the $HeNB_1$ 104a will configure several of its parameters, including functional and/or non-functional parameters. Such parameters may include physical cell identify, transmission power, and adaptive radio resource allocation (for purposes of inter-radio interference avoidance), among others. During the self-configuration, the HeNB 104a may configure these parameters based on similar parameters received from the nearby small cells. In an embodiment, the self-configuration is performed to optimize the communication of the $HeNB_1$ 104a in the network 100, when used in conjunction with the other nearby small cells in the network.

Once the $HeNB_1$ 104a has performed its self-configuration, in order to apprise other interested small cells of its parameters and performance configurations, the $HeNB_1$ 104a publishes its configurations using a PUBLISH message. This PUBLISH message is sent to the S-CSCF module 116 via the P-CSCF module 112, which forwards the message to the application server 130 using the iFC. The application server 130 acknowledges receipt of the $HeNB_1$ 104a parameters with a 200(OK) message.

In accordance with the self-optimization procedures previously described, the application server 130 notifies interested nearby base stations that are subscribed to the self-organization event package. In an exemplary embodiment, the $HeNB_2$ 104b is an active small cell that has subscribed to the event package, and is determined by the application server 130 (based at least on its location) as interested in the configurations of the $HeNB_1$ 104a. In particular, because the application server 130 has previously been apprised of the locations of the various small cells in the network, the application server 130 is able to determine the proximities of the various small cells to each other. As such, when one small cell in the network publishes information to the application server 130, the application server 130 can determine the small cells to transmit that information to based on their proximity to the publishing small cell. In an embodiment, the $HeNB_2$ 104b may reside on a Visited Public Land Mobile Network ($VPLMN_2$) that is different from the VPLMN of the $HeNB_1$ 104a ($VPLMN_1$).

In order to perform the self-optimization, the application server 130 (after having identified the $HeNB_2$ 104b as an interested small cell) forwards the information published by the $HeNB_1$ 104a to the $HeNB_2$ 104b though a NOTIFY message. After the $HeNB_2$ 104b acknowledges receipt of the information through a 200(OK) message, the $HeNB_2$ 104b proceeds to perform self-optimization using the received information. This self-optimization may involve adjusting functional and/or non-functional parameters as well as other configurations in order to adapt to the network changes caused by the addition of, or change to, the HeNB$_1$ 104a.

After self-optimization is completed, the HeNB$_2$ 104b publishes its updated information to the S-CSCF module 116 via the P-CSCF module 112-2 associated with its VPLMN$_2$. The S-CSCF 116 publishes this information to the application server 130 using iFC, which then routes an acknowledgement 200(OK) message back to the HeNB$_2$ 104b via the S-CSCF module 116 and the P-CSCF module 112-2.

By repeating the above processes for different small cells in the network, the small cells are able to repeatedly and continuously re-configure themselves so as to maintain high network efficiency. This allows the network to maintain near-optimal configurations even after initial setup, and even after changes have been made to the network.

Exemplar Additional Capabilities Using Self-Organization

With the above self-organization techniques, several additional advantageous functionalities become available. For example, through the use of the "smart" network, the small cells within the network can assist each other in several different circumstances to even further increase network efficiency and optimization.

Activate/De-Activate Small Cells

One exemplary additional functionality that can be achieved with the above setup is the ability for cells to deactivate, and to be reactivated by nearby small cells 104.

For example, as shown above in the exemplary small cell profiles, certain UEs 102 can be registered with a particular small cell 104 as part of that cell's closed subscriber group (CSG). Many times, all of those UEs 102 will be away from the small cell 104, such that they are not being serviced by the small cell 104. During this time, the small cell 104 can enter a power-saving mode by deactivating itself. This can involve reducing its transmission power, etc. However, it would be beneficial if the small cell 104 could be notified of the return of one of its member UEs 102 so that it could reactivate in order to provide service to its member UEs 102.

In order to achieve this functionality, the small cell 104 subscribes to a "Radio Access Proximity" event package with the application server 130. As one of its members approaches or re-enters the small cell's vicinity, the UE 102 may be detected by one of the neighboring cells 104. When a neighboring cell detects the UE 102, it publishes the detection to the application server 130. In an embodiment, this small cell 104 labels its publication message with "Radio Access Proximity" in the header, or an indication thereof, so as to notify the application server 130 of the relevant event package. The application server 130 acknowledges receipt of the publication with a 200(OK) message, and then issues a notification to the small cell that has the UE 102 as one of its members. This can be done with a NOTIFY message issued from the application server 130.

The notification is received at the small cell, and causes the small cell 104 to re-activate (leave its low-power state). In this manner, the small cell 104 becomes ready to communicate with the UE 102 when the UE 102 reenters its cell coverage area. In an embodiment, because the small cell 104 has been in a power-saving mode, before communicating with the UE 102, the small cell 104 performs self-optimization based on updated information received from the application server 130 regarding nearby cells 104.

Remote Configuring

Figure 7:
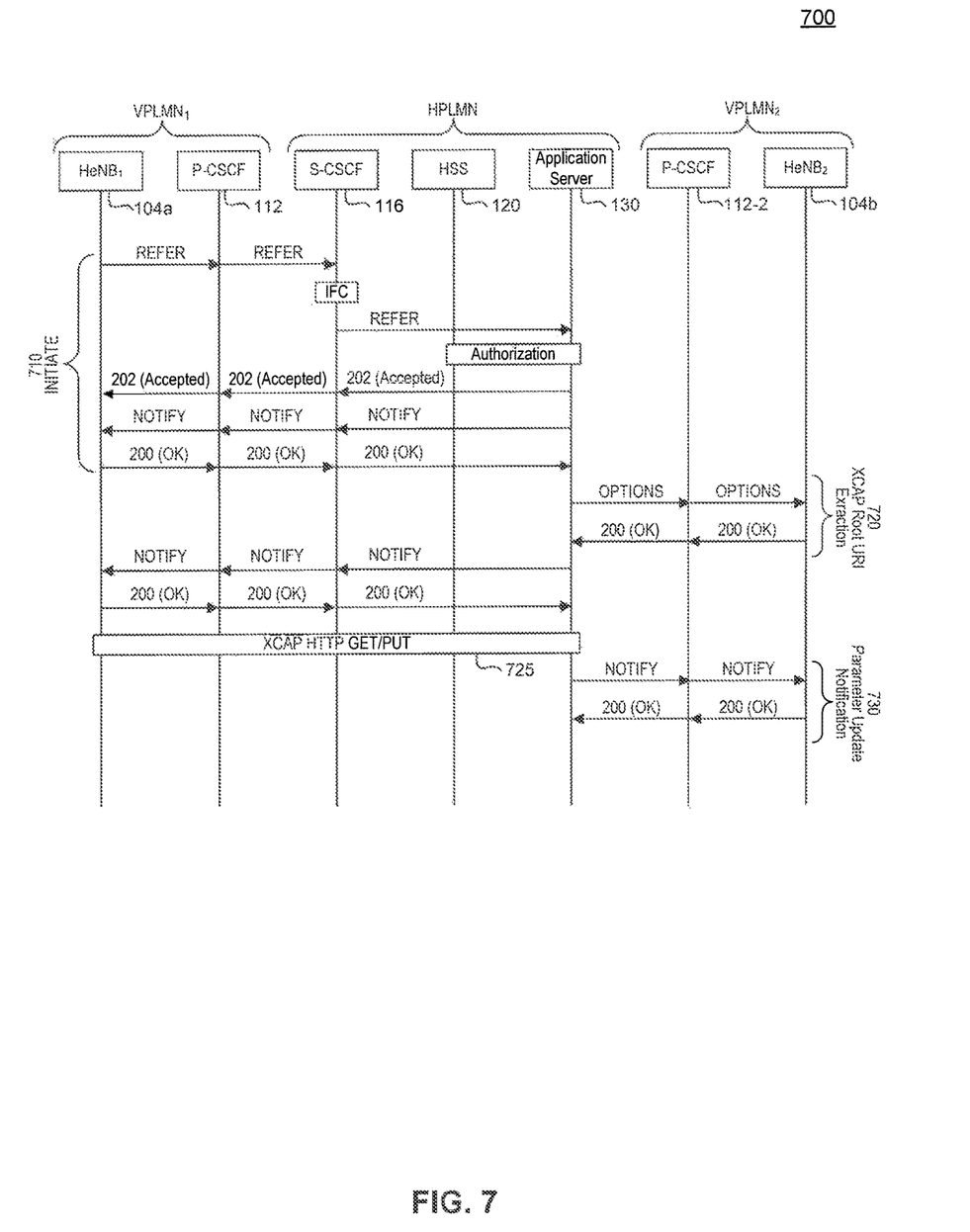
FIG. 7 illustrates a process flow diagram of a method for the first cell making changes to the second cell.

Another unique aspect of this self-organization configuration is the ability for one cell 104 to alter another's configurations and/or parameters. This can be beneficial in many different circumstances, including when a first cell determines that another cell is not functioning properly and when providing cloud services, among others. For purposes of this discussion, it will be presumed that the HeNB$_1$ 104a seeks to make changes to the configurations and/or parameters of HeNB$_2$ 104b. FIG. 7 illustrates a process flow diagram of a method for the first cell 104a making changes to the second cell 104b.

As an initial challenge, in order for the HeNB$_1$ 104a to make changes to the HeNB$_2$ 104b, HeNB$_1$ 104a must determine where the configurations and/or parameters of the HeNB$_2$ 104b are stored. In some circumstances, the configurations/parameters may be stored in a specific portion of memory on the HeNB$_2$ 104b itself. However, in other embodiments, the configurations/parameters may be stored remotely from the HeNB$_2$ 104b, such as when the HeNB$_2$ 104b does not include memory for example. For purposes of this example, it will be presumed that the configurations/parameters of the HeNB$_2$ 104b are stored at the application server 130. Regardless of where the configurations/parameters are stored, their location will be identified by an XCAP Root URI.

Therefore, during an initiate phase 710, the HeNB$_1$ 104a seeks to determine the location of the configurations/parameters of the HeNB$_2$ 104b by acquiring its XCAP Root URI. Therefore, the HeNB$_1$ 104a transmits a REFER message to the S-CSCF module 116 via the P-CSCF module 112. The REFER message is used to refer the application server 130 to the other small cell the HeNB$_1$ 104a is trying to access. The S-CSCF module 116 forwards the REFER message to the application server 130 using iFC.

At this time, because the HeNB$_1$ 104a is attempting to access and modify a remote HeNB$_2$ 104b, the application server 130 cooperates with the HSS 120 to perform an additional authorization of the HeNB$_1$ 104a. This helps to safeguard the HeNB$_2$ 104b from unwanted intrusions and/or modifications. Once the authorization completes, the applications server 130 sends an acknowledgement 202(Accepted) message back to the HeNB$_1$ 104a, which indicates that the REFER message has been successfully received and that the application server 130 is attempting to perform the requested action.

Subsequently, in an XCAP Root URI Extraction portion 720, the application server 130 sends an OPTIONS message to the HeNB$_2$ 104b, whose configurations/parameters are being targeted. This OPTIONS message indicates to the HeNB$_2$ 104b that its XCAP Root URI is going to be provided to the HeNB$_1$ 104a. After receiving an acknowledgement 200(OK) message from the HeNB$_2$ 104b, the application server 130 transmits the XCAP Root URI of the HeNB$_2$ 104b to the HeNB$_1$ 104a, as the XCAP Root URI is stored on the application server 130 in this example, using a NOTIFY message.

Once the HeNB$_1$ 104a has received the XCAP Root URI of the HeNB$_2$ 104b, the HeNB$_1$ 104a can access that root directory and make modifications to the configurations/parameters of the HeNB$_2$ 104b. In an embodiment, the HeNB$_1$ 104a can perform these modifications using the XCAP HTTP GET/PUT command interface 725, which is a well-known command interface. In an embodiment, the XCAP HTTP GET/PUT command interface 725 can extend from the HeNB$_1$ 104a to the HeNB$_2$ 104b when the XCAP Root URI is located on the HeNB$_2$ 104b.

After the HeNB$_1$ 104a has made the necessary modifications to the configurations/parameters of the HeNB$_2$ 104b, the process flow enters a Parameter Update Notification phase 730. During this phase, the application server 130 issues a NOTIFY message to the HeNB$_2$ 104b to inform the HeNB$_2$ 104b that its parameters have been modified. In an embodiment where the root directory is located on the HeNB$_2$ 104*b*, this final phase may not be necessary.

Remote Controlling

Similar to the aspect detailed above, it is also possible for a first cell to disable a second cell in the network 100. Many reasons may exist for why the first cell may choose to do this, such as the first cell detecting that the second cell is malfunctioning. In an embodiment, the first cell may detect the malfunctioning from mobile devices (UEs) within the network.

According to the aforementioned aspect, yet another achievable unique and advantageous functionality is the ability of a first cell to control the manner in which network services are provided to a particular UE or a subscriber by a second cell when the UE is not in the coverage area of the first cell but is in the coverage area of the second cell. In roaming scenarios, this unique ability enables closed subscriber group (CSG) small cells to remotely monitor and possibly control the way their member UEs are served by visited small cells in Visited PLMNs (VPLMNs) when the member UEs are away from their Home PLMN (HPLMN).

An exemplary additional functionality that can be achieved as a result of the same aspect is the ability for a first cell to request a second cell or a group of cells to blacklist a particular UE either due to security concerns or lack of access privilege, or to request a second cell or a group of cells to, either temporarily or permanently, remove a given UE from network access blacklist.

Furthermore, according to yet another exemplary functionality, a first closed subscriber group (CSG) cell can request a second cell, currently serving a particular member UE, to provide the first cell the information pertaining to the type of services and the manner they are requested by the member UE in different location or Visited PLMNs. Using such information, the first closed subscriber group (CSG) cell may instruct a second cell or a group of remote cells in a (to be) Visited PLMN(s) on what types of services the member UE may demand in the Visited PLMNs and how to schedule and/or control the member UE's access privilege to such services. Likewise, any remote small cell, currently serving a member UE in a Visited PLMN, may query the first closed subscriber group (CSG) cell on how to serve the visiting member UE and what types of services may be provisioned to the visiting member UE.

Load-Balancing

Another beneficial and unique aspect of the above configurations, is the ability for cells within the network 100 to balance their loads. In this regard, there are two load-balancing instances: 1) Low Load Mode; and 2) High Load Mode.

If a particular cell (e.g., 104*a*) in the network 100 determines that its network load falls below a first predetermined threshold $Th_L$, the cell 104*a* can publish the low load indication to the application server 130. In an embodiment, a determination can be made either by the application server 130 or the cell 104*a* as to whether there are nearby cells 104 that are not overloaded.

If the determination indicates the presence of such nearby cells, then the low loaded small cell 104*a* can offload one or more of its UEs. One option for offloading its UEs 102 is for the low-load cell 104*a* to gradually reduce its transmit power. As the transmit power reduces, the signal qualities at the UEs 102 will degrade, eventually triggering them to handover to a nearby cell. This can continue until all UEs 102 have been offloaded, at which time the low-load cell 104*a* can enter a low power state.

In addition, or alternatively, to the gradual transmit power decrease, the low-load cell 104*a* can reconfigure the measurement configuration in the UEs 102 such that the handover thresholds are altered by manipulating the nearby cells' frequency (offsetFreq) and cell specific offsets (cellIndividualOffset), such that all UEs 102 are handed over to one or more nearby cells.

Using the application server 130 to assist with the offloading, the application server 130 can detect candidate small cells 104 for receiving the offloaded UEs 102 based on their respective locations relative to the low load cell 104*a*. In an embodiment, the application server 130 can cause those candidate cells 104 to increase their transmit powers, which will assist the UEs 102 in making handover decisions, and help to ensure that all UEs 102 are offloaded from the low load cell 104*a* in a timely manner.

In the High Load Mode, the serving cell (e.g., 104*b*) determines that its network load exceeds a predetermined threshold $Th_H$. In this scenario, the serving cell 104*b* can publish its high load state to the application server 130. Again, the application server 130 can determine offload candidate cells 104 in the network to receive offloaded UEs from the serving cell 104*b*.

The serving cell 104*b* can then perform offloading of cell edge UEs 102 (UEs 102 near the edge of the cell coverage of the serving cell 104*b*) by gradually reducing its transmit power to trigger handovers in the cell edge UEs 102 and/or by reconfiguring the offsetFreq and cellIndividualOffsets of the nearby cells 104. Once enough UEs 102 have been offloaded, the serving cell 104*b* can return to a normal transmit power and/or the UEs 102 can be reconfigured back to their default parameters.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

What is claimed is:

1. A method of facilitating self-organization within a network by an application server, the network including at least a first small cell and a second small cell, the method comprising:

receiving a self-organization subscription request from the second small cell;

maintaining the second small cell in a self-organization subscription based on the self-organization subscription request;

receiving, from the first small cell, a notification of changes made to a parameter of the first small cell; and notifying the second small cell of the changes made to the first small cell.

2. The method of claim 1, further comprising identifying the second small cell as an interested small cell based on its proximity to the first small cell.

3. The method of claim 2, further comprising receiving a first location of the first small cell from the first small cell and a second location of the second small cell from the second small cell,
wherein the proximity is calculated based on the received first location and second location.

4. The method of claim 1,
wherein the notification of changes received from the first small cell includes a label identifying the notification of changes as pertaining to the self-organization subscription, which causes the notifying of the second small cell.

5. The method of claim 1, wherein the notification of changes received from the first small cell indicates detection of a device subscribed to the second small cell, and
wherein the notifying of the second small cell includes activating the small cell.

6. The method of claim 1, wherein the notification of changes received from the first small cell includes an indication that the first small cell is operating in a high-load state or a low-load state, and
wherein the notifying of the second small cell includes an instruction for the second small cell to modify one of its frequency offset or cell specific offset.

7. The method of claim 6, wherein the notification of changes received from the first small cell indicates that the second small cell is in a malfunctioning state, and
wherein the notifying of the second small cell includes de-activating the second small cell.

8. The method of claim 1, wherein the notification of changes is received via a SIP message that includes an ID of the first small cell.

9. A method of performing self-organization of a first small cell within a wireless network, the method comprising:
receiving a first location and a first globally-unique identifier of the first small cell from the first small cell;
receiving a notification that a parameter of a second small cell within the wireless network has been modified;
first determining whether the second small cell is in a high-load state or a low-load state based on the notification, wherein the high-load state is defined by a network load of the second small cell exceeding a first predetermined threshold and the low-load state is defined by the network load of the second small cell being below a second predetermined threshold;
second determining whether the first small cell is to be notified of the modification; and
notifying the first small cell of the modification based on the second determining.

10. The method of claim 9, further comprising calculating a proximity of the first small cell to the second small cell based on the received first location and a previously-stored second location of the second small cell,
wherein the second determining is based on the calculated proximity.

11. The method of claim 9, further comprising generating a profile of the first small cell that includes the first location and the first globally-unique identifier.

12. The method of claim 11, further comprising receiving a proximity detection notification from the second small cell indicating that a member device of the first small cell has been detected within a vicinity of the first small cell; and
activating the first small cell,
wherein the member device is identified as a member of the first small cell based on its inclusion within the profile.

13. The method of claim 9, further comprising gradually reducing a transmission power of the first small cell.

14. The method of claim 9, wherein the notification includes a label identifying the notification as pertaining to a self-organization subscription, which causes the notifying of the first small cell.

15. A method of facilitating self-organization within a network by an application server, the network including at least a first small cell and a second small cell, the method comprising;
receiving, from the second small cell, a request for a subscription;
transmitting to the second small cell, in response to the request, a confirmation message that includes a configuration and an operational state of the first small cell;
receiving, from the first small cell, a notification of changes made to a parameter of the first small cell; and
notifying the second small cell of the changes made to the first small cell,
wherein the notification of changes received from the first small cell includes an indication of a load state of the first small cell, and
wherein the notifying of the second small cell includes an instruction for the second small cell to modify one of its frequency offset or cell specific offset based on the load state of the first small cell.

16. The method of claim 15, wherein the notifying is performed based on a proximity between the first small cell and the second small cell.

17. The method of claim 16, further comprising determining, in response to receiving the notification of changes, that the second small cell is within a predetermined distance threshold from the first small cell.

18. The method of claim 16, wherein the second small cell resides on a Visited Public Land Mobile Network (VPLMN) that is different from a VPLMN of the first small cell.

19. The method of claim 15, wherein the parameter includes physical cell identity, transmission power, or adaptive radio resource allocation.

20. The method of claim 15, wherein the notification of changes received from the first small cell includes a flag identifying whether the notification of changes pertains to the subscription.

21. The method of claim 15, wherein the notification of changes received from the first small cell includes a label identifying the notification of changes as pertaining to the subscription, which causes the notifying of the second small cell.

* * * * *